UNITED STATES PATENT OFFICE.

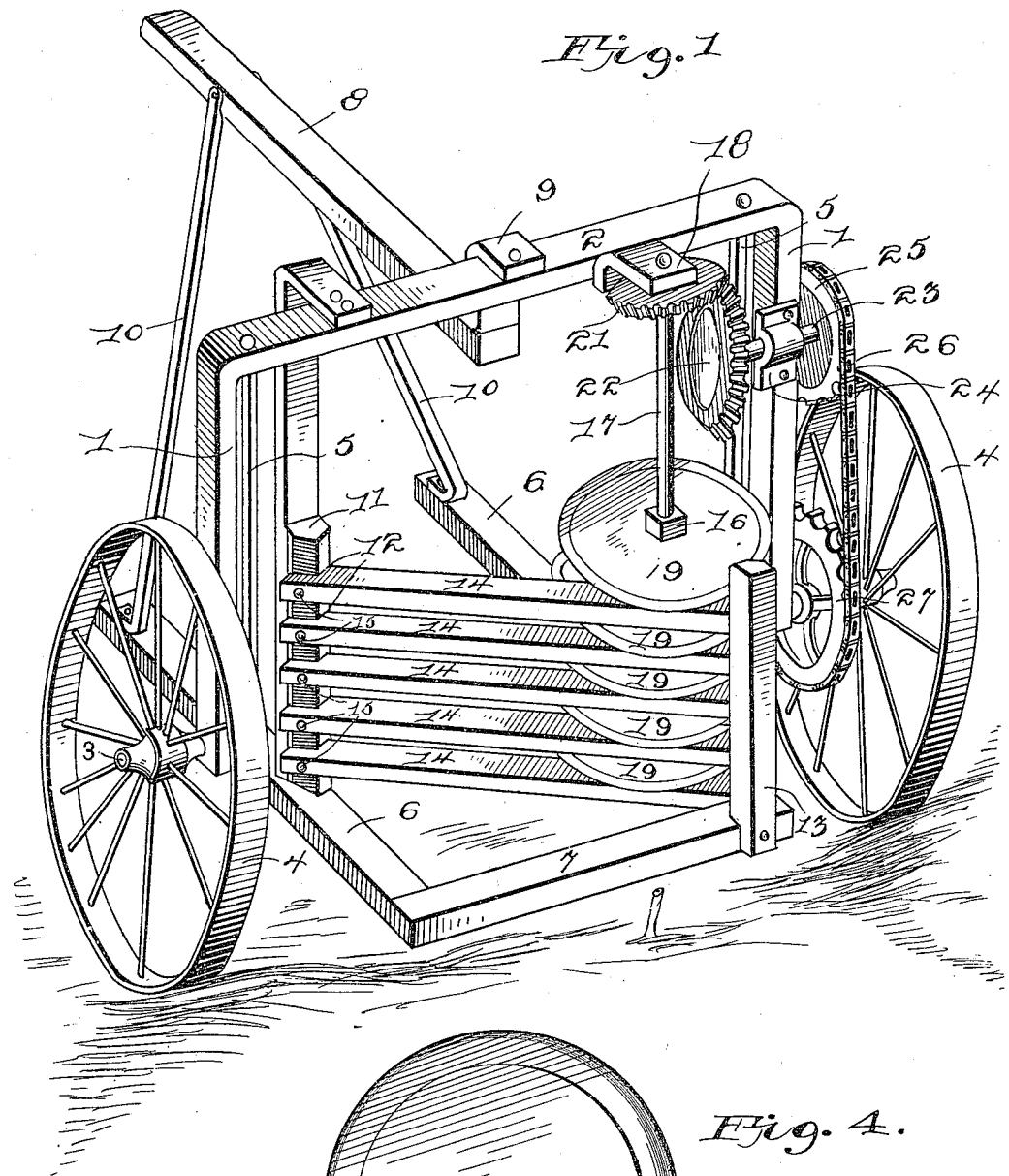

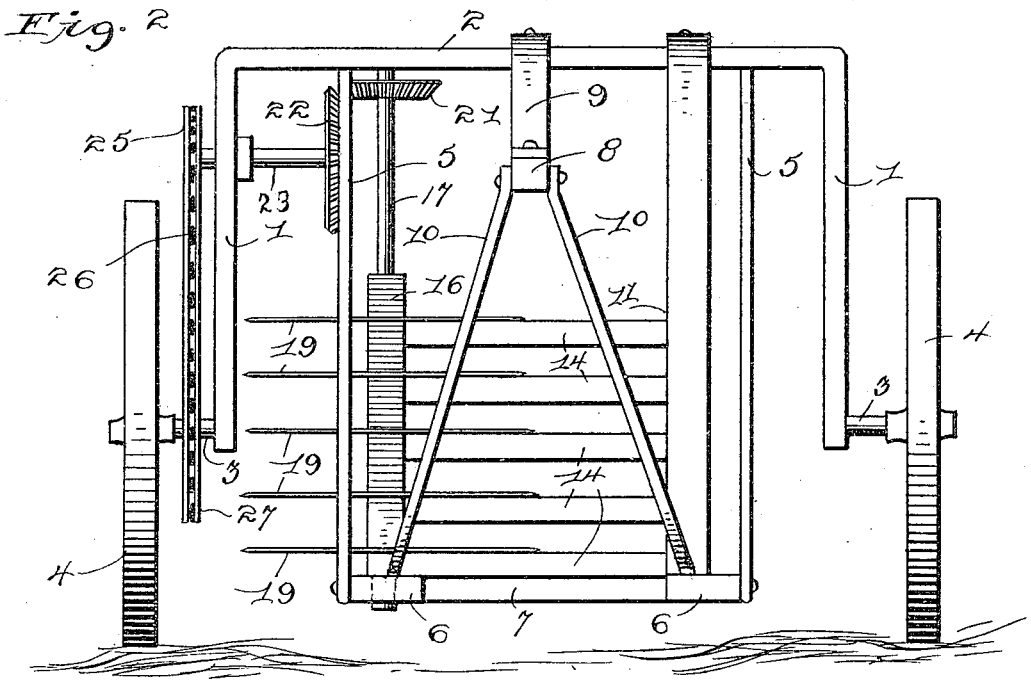
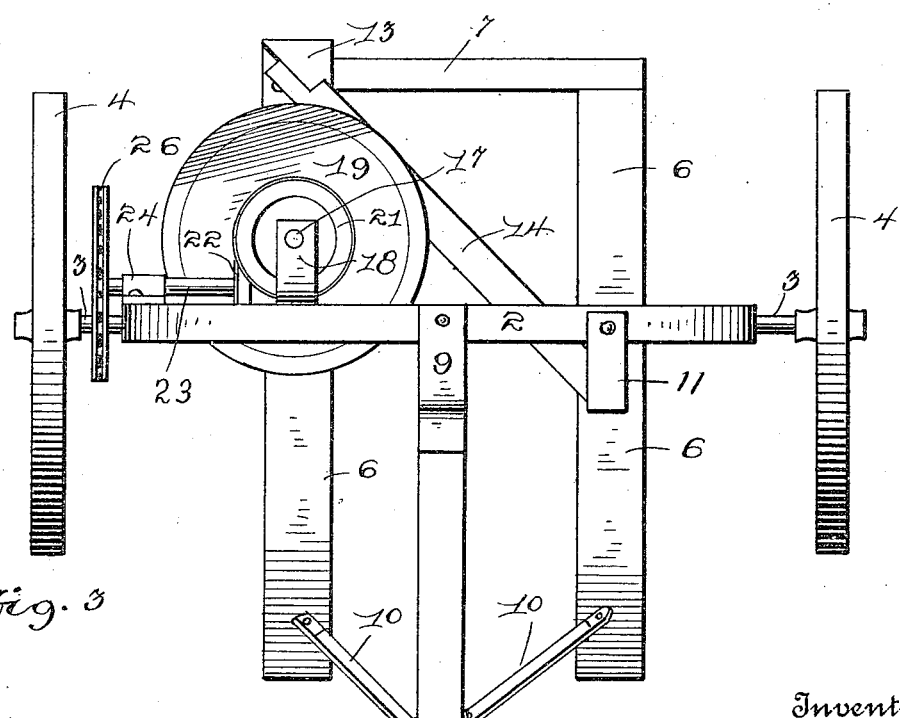

THOMAS A. DAVIS, OF BLANKET, TEXAS.

STALK-CUTTER.

952,727.  Specification of Letters Patent.  Patented Mar. 22, 1910.

Application filed June 23, 1909.  Serial No. 503,841.

*To all whom it may concern:*

Be it known that I, THOMAS A. DAVIS, a citizen of the United States of America, residing at Blanket, in the county of Brown and State of Texas, have invented certain new and useful Improvements in Stalk-Cutters, of which the following is a specification, reference being had therein to the accompanying drawing.

This invention relates to stalk choppers, and the principal object of the same is to provide for guiding the stalks to a plurality of rotating knives which will sever each stalk into several particles so that the rottening of the stalks will be quickened, thereby facilitating the fertilizing of the soil.

In carrying out the objects of the invention generally stated above it is contemplated employing a wheeled frame which straddles the stalks to be chopped and is provided with novel guiding means for conducting the stalks to a plurality of horizontally arranged cutting disks which are being constantly rotated by the movement of the said wheeled frame.

It will be understood, of course, that in the practical application of the invention the essential features of the same are susceptible of changes in details and structural arrangements, but a preferred and efficient embodiment thereof is shown in the accompanying drawings, wherein—

Figure 1 is a perspective view of the improved stalk chopper. Fig. 2 is a front view. Fig. 3 is a plan view. Fig. 4 is a detail plan view of one of the cutting disks.

Referring to said drawings by numerals, it will be observed that the machine comprises primarily an arch shaped frame, the vertical side members 1 of which are oppositely disposed and connected by the top horizontal member 2. Each side member 1 carries an outstanding stub axle 3 upon which the traction wheels 4 are mounted. The horizontally arranged top member 2 of the arched frame carries two pendent supporting bars 5 which are vertically arranged and have their lower ends attached to the outer sides of the longitudinal side members 6 of a horizontally arranged frame the forward end of which is open, and the rear end of which is closed by the connecting member 7 which connects said longitudinal side members 6. A tongue 8 has a hanger bracket connection 9 with the central portion of the top 2 of the arch-shaped frame, and also has brace rod connections 10 with the forward portions of the side members 6. A standard 11 is carried by one of the members 6, said standard being located adjacent to the bar 5 and being provided with regularly spaced apart horizontally arranged holding notches 12 on its rear face. A similar standard 13 is located adjacent to the junction of the connecting member 7 and the opposite side member 6 so as to be diagonally opposite the standard 11. The standards have their notches in alinement for the reception of opposite ends of spaced apart bars 14, said bars being held in detachable engagement with said standards by means of screws 15, or equivalent detachable fasteners.

A vertically arranged rectangular shaft 16 has its lower end journaled in the side member 6 adjacent to the rear ends of the spaced apart bars 14, the upper end of said shaft being reduced and of tubular shape, as indicated at 17 and journaled in an outstanding bearing 18 projecting from the top 2 of the arch-shaped frame. A plurality of cutting disks 19 are fast on the squared or rectangular shaped portion of the shaft 16, said disks being of a true circular shape and provided with a square central opening 20 adapted for a snug fit around said shaft 16. The disks are regularly spaced apart so that one of the same will project between each two bars 14 and the top disk will project across the upper bar.

A beveled gear 21 is fast on the portion 17 of the shaft 16 adjacent the bearing 18, said gear being in mesh with a similar gear 22 carried by a shaft 23 projecting through a bearing 24 carried by one of the members 1 of the arched frame. The outer end of said shaft 23 carries a sprocket wheel 25 which has a chain connection 26 with a similar, but larger, sprocket 27 mounted on one of the stub axles 3.

It will be readily seen that as the machine is moved over a field the stalks will enter the open end of the horizontal frame and be brought into contact with the spaced apart horizontally arranged guiding bars 14 so as to be conducted to the circular knives 19 which are being rotated by means of the described gear connection with the axle 3, so that the stalks will be severad into a plurality of small particles, which are allowed to fall to the ground and are afterward plowed under, as is understood.

The arrangement of the two frames, that is the arched frame which straddles the stalks to be chopped, and the horizontally arranged frame which is supported by the first mentioned frame and which serves to gather in the stalks is such that the tongue is supported in a raised position so that it will not be in the way of the stalks to be cut.

A prominent feature of the invention is in the arrangement of the guiding bars 14 so that the stalks will be conducted directly to the cutting disks, and as said disks are true circles, it will be seen that they are always presenting a cutting edge for operation on the stalks conducted to them.

What I claim as my invention is:—

1. A stalk chopper comprising an arch shaped supporting frame, wheels therefor, a horizontally arranged gathering frame carried by the supporting frame, a shaft mounted on said gathering frame, a plurality of regularly spaced apart horizontally arranged cutting disks fast on said shaft, means for operating said shaft, and a plurality of regularly spaced-apart guiding bars extending diagonally across the rear end of the gathering frame and adapted to conduct stalks to said disks.

2. A stalk chopper comprising a supporting frame, a gathering frame carried thereby, a vertically arranged shaft having one end supported in the gathering frame and its other end supported in the supporting frame, said shaft having a squared portion, a plurality of spaced apart cutting disks having central openings and fitted in spaced relation on said shaft, standards carried by the gathering frame, said standards being located at diagonally opposite portions of said frame, guiding bars supported by said standards and extending between said cutting disks, and means for rotating said shaft.

3. A stalk chopper comprising a vertically arranged supporting frame, axles for said frame, wheels for said axles, a longitudinally arranged gathering frame supported by the vertical frame and having a forwardly projecting open end and a closed rear end; a shaft supported by the rear of said gathering frame and the upper part of said vertical frame, spaced apart cutting disks on said shaft, diagonally arranged spaced apart guide bars extending across the rear of said gathering frame, said disks projecting between said spaced apart guiding bars, and gear connections between said shaft and one of said axles.

In testimony whereof I hereunto affix my signature in presence of two witnesses.

THOMAS A. DAVIS.

Witnesses:
E. J. MILLER,
JAS. W. WAYMAN.